US012432119B2

(12) United States Patent
Sivasiva Ganesan et al.

(10) Patent No.: US 12,432,119 B2
(45) Date of Patent: Sep. 30, 2025

(54) INTEGRATION OF COMMUNICATION NETWORK IN TIME SENSITIVE NETWORKING SYSTEM

(71) Applicant: NOKIA TECHNOLOGIES OY, Espoo (FI)

(72) Inventors: Rakash Sivasiva Ganesan, Unterhaching (DE); Peter Rost, Heidelberg (DE); Christian Markwart, Munich (DE); Borislava Gajic, Unterhaching (DE); Christian Mannweiler, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/735,488

(22) Filed: Jun. 6, 2024

(65) Prior Publication Data

US 2025/0008411 A1    Jan. 2, 2025

Related U.S. Application Data

(63) Continuation of application No. 16/862,756, filed on Apr. 30, 2020, now Pat. No. 12,035,220.

(30) Foreign Application Priority Data

May 2, 2019  (WO) ................ PCT/EP2019/061313

(51) Int. Cl.
*H04L 41/12* (2022.01)
*H04W 40/24* (2009.01)

(52) U.S. Cl.
CPC ........... *H04L 41/12* (2013.01); *H04W 40/246* (2013.01)

(58) Field of Classification Search
None
See application file for complete search history.

(56) References Cited

U.S. PATENT DOCUMENTS 8,046,450 B1 * 10/2011 Schloss ............... H04L 41/0809
                                                  713/2
10,805,169 B2 * 10/2020 Zheng ................... H04L 45/036
(Continued)

FOREIGN PATENT DOCUMENTS

CA    2419005 A1    8/2003
CN    1774134 A     5/2006
(Continued)

OTHER PUBLICATIONS

3GPP 23.501 V16.0.2, 3rd Generation Partnership Project; Technical Specification Group Services and System Aspects; System Architecture for the 5G System; Stage 2 (Release 16) (Apr. 2019), 317 pages.
(Continued)

*Primary Examiner* — Christopher T Wyllie
(74) *Attorney, Agent, or Firm* — Alston & Bird LLP

(57) ABSTRACT

An apparatus is provided for use by a network agent element or function to conduct link layer information related processing. The apparatus is caused to receive first link layer related information from a neighboring network element or function, forward second link layer related information to a communication network control element or function, receive third link layer related information from a communication network control element or function, and forward fourth link layer related information to a neighboring network element or function. The second and fourth link layer related information are generated using first and third link layer related information, respectively. The second and third link layer related information is received and forwarded via a wireless connection path of a wireless communication network. The apparatus is connected to or part of the/or communication element or function, a communication network control ele-
(Continued)

ment or function and a communication network data element or function.

18 Claims, 8 Drawing Sheets

(56) References Cited

U.S. PATENT DOCUMENTS

| | | | |
|---|---|---|---|
| 11,388,060 B1* | 7/2022 | Subramanian | G06F 13/28 |
| 11,419,072 B2* | 8/2022 | Ha | H04L 69/22 |
| 12,035,220 B2* | 7/2024 | Sivasiva Ganesan | H04L 41/12 |
| 2006/0116118 A1 | 6/2006 | Charriere et al. | |
| 2010/0311430 A1* | 12/2010 | Katayama | H04L 1/0029 |
| | | | 455/450 |
| 2011/0176629 A1* | 7/2011 | Bayesteh | H04B 7/0417 |
| | | | 375/267 |
| 2011/0274099 A1* | 11/2011 | Kwon | H04L 1/0068 |
| | | | 370/338 |
| 2012/0281658 A1 | 11/2012 | Rikkinen et al. | |
| 2014/0334442 A1 | 11/2014 | Kanamarlapudi et al. | |
| 2015/0334001 A1* | 11/2015 | Sato | H04L 41/122 |
| | | | 370/392 |
| 2016/0080254 A1 | 3/2016 | Zhou et al. | |
| 2016/0088578 A1 | 3/2016 | Das et al. | |
| 2016/0301506 A1* | 10/2016 | Halbauer | H04B 7/0617 |
| 2017/0150502 A1* | 5/2017 | Chirala | H04W 36/0069 |
| 2017/0303169 A1* | 10/2017 | Hampel | H04W 36/0066 |
| 2018/0184438 A1 | 6/2018 | Cavalcanti et al. | |
| 2018/0338265 A1 | 11/2018 | Goel et al. | |
| 2019/0132210 A1 | 5/2019 | Zheng et al. | |
| 2019/0342782 A1* | 11/2019 | Yum | H04L 5/0082 |
| 2020/0259896 A1* | 8/2020 | Sachs | H04L 67/12 |
| 2020/0351752 A1* | 11/2020 | Sivasiva Ganesan | H04W 40/246 |
| 2020/0351973 A1* | 11/2020 | Mannweiler | H04W 88/18 |
| 2021/0007160 A1* | 1/2021 | Sivasiva Ganesan | H04W 8/005 |
| 2021/0204172 A1* | 7/2021 | Rost | H04L 43/026 |
| 2021/0243771 A1* | 8/2021 | Mannweiler | H04W 24/02 |
| 2022/0061063 A1* | 2/2022 | Patel | H04W 28/0268 |
| 2022/0224651 A1* | 7/2022 | Rost | H04L 47/28 |
| 2022/0369157 A1* | 11/2022 | De Andrade Jardim | H04L 12/4641 |

FOREIGN PATENT DOCUMENTS

| | | | | |
|---|---|---|---|---|
| CN | 101808370 A * | 8/2010 | | H04L 1/0026 |
| CN | 102710380 A | 10/2012 | | |
| CN | 102714890 A | 10/2012 | | |
| CN | 105684322 A | 6/2016 | | |
| CN | 107113862 A | 8/2017 | | |
| CN | 107566277 A | 1/2018 | | |
| CN | 109076407 A | 12/2018 | | |
| EP | 2479914 A1 * | 7/2012 | | H04L 1/0026 |
| EP | 3319272 A1 | 5/2018 | | |
| EP | 3 461 080 A1 | 3/2019 | | |
| IN | 201717019657 A | 11/2017 | | |
| WO | WO-2012041107 A1 * | 4/2012 | | H04L 1/0026 |
| WO | WO 2014/048499 A1 | 4/2014 | | |
| WO | 2016/099369 A1 | 6/2016 | | |
| WO | WO 2019/166081 A1 | 9/2019 | | |
| WO | WO-2020021309 A1 * | 1/2020 | | H04J 3/0658 |
| WO | WO-2020221468 A1 * | 11/2020 | | H04L 41/12 |

OTHER PUBLICATIONS

3GPP TR 23.734 V16.1.0, 3rd Generation Partnership Project; Technical Specification Group Services and System Aspects; Study on Enhancement of 5GS for Vertical and LAN Services (Release 16) (Mar. 2019) 111 pages.
Bohm, M. et al., Architectural Design of a TSN to SDN Gateway in the Context of Industry 4.0, IEEE Communications Surveys and Tutorials, vol. 21 (May 2018) 7 pages.
First Examination Report for Indian Application No. 202147054969 dated Jun. 17, 2022, 8 pages.
IEEE P802.1AB-REV/D1.2, Station and Media Access Control Connectivity Discovery (Nov. 11, 2015) 143 pages.
International Search Report and Written Opinion for Application No. PCT/EP2019/061313 dated Oct. 28, 2019, 16 pages.
Neumann, A. et al., Towards Integration of Industrial Ethernet With 5G Mobile Networks, IEEE (2018) 4 pages.
Non-Final Office Action for U.S. Appl. No. 16/862,756 dated Mar. 14, 2023.
Non-Final Office Action for U.S. Appl. No. 16/862,756 dated Mar. 18, 2022.
Notice of Allowance for U.S. Appl. No. 16/862,756 dated Feb. 27, 2024.
Office Action for Chinese Application No. 201980097662.6 dated Nov. 24, 2023, 16 pages.
Office Action for European Application No. 19722568.3 dated Feb. 1, 2024, 7 pages.
TSC Architecture, S2-1902060, SA WG2 Meeting #130, CR Request 23.501 (Jan. 2019), 4 pages.
IEEE 802 [online] [retrieved May 26, 2020]. Retrieved via the Internet: https://web.archive.org/we b/20190424211327/https://1.ieee802.org/ (dated Apr. 24, 2019) 5 pages.
Notice of Allowance for Chinese Application No. 201980097662.6 dated Sep. 20, 2024, 7 pages.

* cited by examiner

INTEGRATION OF COMMUNICATION NETWORK IN TIME SENSITIVE NETWORKING SYSTEM

CROSS-REFERENCE TO RELATED APPLICATIONS

This application is a continuation of U.S. application Ser. No. 16/862,756, filed Apr. 30, 2020, which claims priority to International Application No. PCT/EP2019/061313, filed May 2, 2019, the entire contents of which are hereby incorporated by reference in their entities.

BACKGROUND

Field

Examples of embodiments relate to apparatuses, methods, systems, computer programs, computer program products and (non-transitory) computer-readable media usable for integrating a communication network, such as a wireless communication network based on 3GPP standards, in a time sensitive networking (TSN) or Ethernet based system, and in particular to apparatuses, methods, systems, computer programs, computer program products and (non-transitory) computer-readable media usable for supporting discovery of network topology in the TSN system or Ethernet based system.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3$^{rd}$ Generation Partnership Project
4G fourth generation
5G fifth generation
5GS 5G system
AF application function
AMF access and mobility function
AUSF authentication server function
BMO bridge managed object
BS base station
CN core network
CNC centralized network controller
CP control plane
CPU central processing unit
CUC centralized user configurator
eNB evolved node B
ETSI European Telecommunications Standards Institute
FRER frame replication and elimination for reliability
gNB next generation node B
ID identifier, identification
IEEE Institute of Electrical and Electronics Engineers
IoT Internet of things
LTE Long Term Evolution
LTE-A LTE Advanced
MIB management information base
MSRP multiple SRP
NEF network exposure function
NF network function
NG new generation
NRF network repository function
NW network
PCF policy control function
PCP priority code point
PDU packet data unit
QoS quality of service
RAN radio access network
RAT radio access technology
SIM subscriber identity module
SMF session and mobility management function
SNMP simple network management protocol
SRP stream reservation protocol
TPMR two-port MAC replay
TSN time sensitive networking
UDM unified data management
UE user equipment
UMTS universal mobile telecommunication system
UP user plane
UPF user plane function
VLAN virtual local area network

SUMMARY

According to an example of an embodiment, there is provided, for example, an apparatus for use by a network agent element or function configured to conduct a link layer information related processing, the apparatus comprising at least one processing circuitry, and at least one memory for storing instructions to be executed by the processing circuitry, wherein the at least one memory and the instructions are configured to, with the at least one processing circuitry, cause the apparatus at least: to receive first link layer related information from at least one neighboring network element or function, and to forward second link layer related information to at least one communication network control element or function, and to receive third link layer related information from at least one communication network control element or function, and to forward fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the apparatus is connected to or part of one of the communication element or function, a communication network control element or function of the wireless communication network and a communication network data element or function of the wireless communication network.

Furthermore, according to an example of an embodiment, there is provided, for example, a method for use in a network agent element or function configured to conduct a link layer information related processing, the method comprising receiving first link layer related information from at least one neighboring network element or function, and forwarding second link layer related information to at least one communication network control element or function, and receiving third link layer related information from at least one communication network control element or function, and forwarding fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the method is implemented in an entity connected to or being part of one of the communication element or function, a communication network control element or function of the wireless communication network and a communication network data element or function of the wireless communication network.

According to further refinements, these examples may include one or more of the following features:

- at least one of the first or second link layer related information may be processed, and the link layer related information may be transformed into management information base information retrievable by a management element or function for network topology discovery;
- the wireless communication network may form a bridge element for a time sensitive networking system or Ethernet based networking system, wherein a communication element or function of the wireless communication network may represent one end point of the bridge element being connectable with at least one end station or another bridge element of the time sensitive networking system or Ethernet based networking system, and a core network element or function of the wireless communication network may represent another end point of the bridge element towards another end station or another bridge element of the time sensitive networking system or Ethernet based networking system, wherein a translator element or function may be connected to or part of a core network element or function of the wireless communication network and a translator client element or function may be connected to or part of the communication element or function, and wherein the apparatus may be connected to or part of at least one of the translator element or function and the translator client element or function;
- for receiving and forwarding of the second and third link layer related information from and to the at least one communication network control element or function, at least one data session between the translator client element or function and the translator element or function may be established;
- for receiving and forwarding of the second and third link layer related information from and to the at least one communication network control element or function, at least one control information signaling between a communication element or function and at least one communication network control element or function of the wireless communication network may be established;
- for receiving and forwarding of the second and third link layer related information from and to the at least one communication network control element or function, at least one data session between a communication element or function and a communication network data element or function of the wireless communication network may be established;
- for receiving and forwarding the link layer related information, a communication service provided by the translator element or function and the translator client element or function, or an own communication service being different to that provided by the translator element or function and the translator client element or function may be employed;
- a transparent processing for the wireless communication network may be conducted, wherein the apparatus may be connected, via the translator element or function or the translator client element or function, to at least one of the communication element or function and the communication network data element or function as an external element of the wireless communication network, or an integrated processing may be conducted wherein the apparatus may be, by the translator element or function or the translator client element or function, an internal part of at least one of the communication element or function and the core network element or function of the wireless communication network;
- the link layer related information may be received and forwarded in one of a synchronous mode by a direct communication via an active data session between the translator client element or function and the translator element or function, and an asynchronous mode including to temporarily store, in the translator element or function or the translator client element or function, the link layer related information until a suitable connection between the translator client element or function and the translator element or function is available;
- a periodical update of the link layer related information may be conducted by transmitting the link layer related information from the apparatus connected to or being part of the translator client element or function towards the translator element or function, or by transmitting the link layer related information from the apparatus connected to or being part of the translator element or function towards the translator client element or function;
- when a change in link layer related information is detected, at least one of transmitting the link layer related information from the apparatus connected to or being part of the translator element or function towards the translator client element or function and transmitting the link layer related information from the apparatus connected to or being part of the translator client element or function towards the translator element or function may be conducted;
- information required for receiving or sending the link layer related information from or to the at least one neighboring network element or function may be obtained from a communication network control element or function of the wireless communication network, by using a control signaling procedure defined in the wireless communication network;
- information obtained by receiving the link layer related information from the at least one neighboring network element or function may be provided to a communication network control element or function of the wireless communication network by using a control signaling procedure defined in the wireless communication network;
- the link layer related information may comprise link layer discovery protocol information including medium access control address information of devices connected to the network agent element or function or the at least one neighboring network element or function;
- the fourth link layer related information may be forwarded to at least one neighboring network element or function when a port used for connecting the at least one neighboring network element or function is declared to be active;

the wireless communication network may be based on a 3GPP standard.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
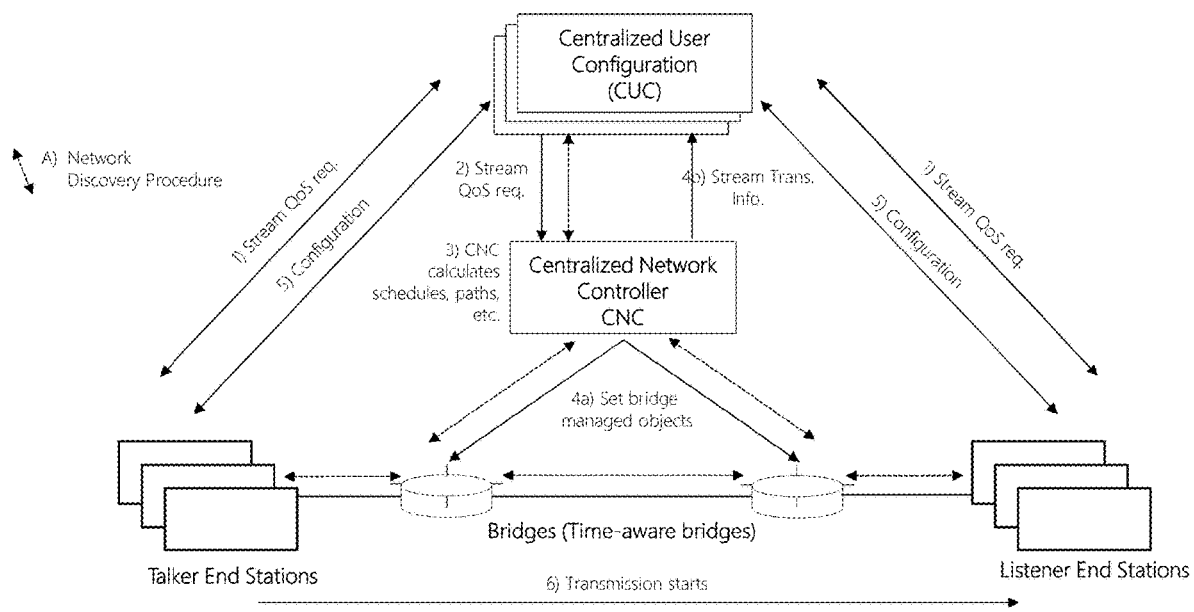
FIG. 1 shows a diagram illustrating an example of a TSN system including a flow of commands.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

New communication systems, such as the 5G System (5GS), are developed in order to support new business models such as those for IoT and enterprise managed networks. Services such as unmanned aerial vehicle control, augmented reality, and factory automation are intended to be provided. Network flexibility enhancements support self-contained enterprise networks, installed and maintained by network operators while being managed by the enterprise. Enhanced connection modes and evolved security facilitate support of massive IoT, expected to include tens of millions of UEs sending and receiving data over the 5G network.

As indicated above, one use case is factory automation which is also referred to as vertical industries (i.e. Industry 4.0). Vertical industries are related to e.g. discrete automation, process automation, and intelligent transport systems in industrial factories or the like. Design principles concern several aspects, such as, for example, interconnection, i.e. the ability of machines, devices, sensors, and people to connect and communicate with each other via IoT, information transparency, i.e. the provision of operators with useful information needed to make appropriate decisions from all points in the manufacturing process, technical assistance, i.e. the ability of assistance systems to support humans by aggregating and visualizing information comprehensively for making informed decisions and solving urgent problems on short notice, and the ability of cyber physical systems to physically support humans by conducting a range of tasks, and decentralized decisions, i.e. the ability of cyber physical systems to make decisions on their own and to perform their tasks as autonomously as possible.

Cyber-physical systems are to be understood as systems that include engineered, interacting networks of physical and computational components. Cyber-physical control applications are to be understood as applications that control physical processes. Cyber-physical control applications in automation follow certain activity patterns, which are open-loop control, closed-loop control, sequence control, and batch control Communication services supporting cyber-physical control applications need to be ultra-reliable, dependable with a high communication service availability, and often require low or (in some cases) very low end-to-end latency. Communication in automation in vertical domains follows certain communication patterns. One example for such a communication pattern is a periodic deterministic communication.

As described above, communication systems employed in applications like vertical industries have to fulfill certain requirements, such as high communication service availability and low end-to-end latency. In order to provide such capabilities, mechanisms for Time Sensitive Networking (TSN) as defined by IEEE are integrated with 5GS. TSN is currently standardized as the mechanism for communication within industrial networks. A set of IEEE 802.1 protocols (IEEE 802.1AS-Rev, 802.1CB, 802.1Qcc, 802.1Qch, 802.1Qci, 802.1Qcj, 802.1 CM, 802.1Qcp, 802.1Qcr, 802.1AB) is applied to achieve deterministic data transmission.

That is, TSN (or Time Sensitive Communication (TSC)) refer to a communication service that supports deterministic communication and/or isochronous communication with high reliability and availability. It is about providing packet transport with bounds on latency, loss, packet delay variation (jitter), and reliability, where end systems and relay/transmit nodes can be strictly synchronized.

Currently, in industries, TSN is used as a mechanism to provide end to end connectivity with deterministic capacity and delay. The talkers (e.g., sensors, controllers) and listeners (e.g. controllers, actuators) are connected through bridges using cables.

FIG. 1 shows the entities involved in TSN. One of the key consideration for TSN standardization is to have a centralized entity, named CNC (Centralized Network Controller), which collects the requirements of end to end communication between the Talker End Stations and Listener End Stations and performs scheduling centrally. Bridges learn the connection information for their immediate network peer in each physical port using link layer related data, such as, for example, using the link layer discovery protocol (LLDP). Each TSN network domain has a single CNC. In addition, there might be multiple centralized user configurators (CUCs) which translate the requirements of the end to end communication and communicate it to the CNC. Furthermore, the CUC is responsible for configuring the respective Talker and Listener End Stations with transmission parameters computed by the CNC during the scheduling process. The solid arrows in FIG. 1 describe the main steps 1-6 involved in establishing a communication between a Talker and a Listener End Station.

Namely, according to 1), CUC obtains the stream Quality of Service (QOS) from the endstations. Then, according to 2) CUC provides the stream QoS requirements to CNC. In 3) CNC calculates schedules, paths etc. in order to fulfil the stream QoS requirements. In 4a) the CNC provides the schedule to each bridge using the respective bridge managed objects. In 4b), CNC informs CUC about Stream Trans. Info which contains the configuration parameters that the Talker End Station needs to use e.g. destination MAC address, VLAN ID and PCP field. It also has the transmit time window in which the Talker should transmit and the receive time window in which the listener should expect to receive the packets.

Then, in 5) CUC configures the end stations accordingly. In parallel, as shown by dashed lines in FIG. 1, network discovery procedures run between related entities (i.e., between neighboured bridges, between each bridge and CNC, between CNC and CUC, and between each station and the respective bridge it is connected to). After that, in 6), transmission between talker end stations and listener end stations may be performed.

It is to be noted that the bridges are time-aware in a TSN network. There may be one or more bridges between a talker end station and a respective listener end station. In FIG. 1, two bridges are shown as an example. Each talker end station may talk to one or more listener end stations, and each listener end station may listen to one or more talker end stations. A listener end station of one communication may be a talker end station of another communication.

In a main target scenario, the tactile industrial network, also known as Industrial IoT (IIoT) or Industry 4.0 networks, 3GPP technologies are applied in addition to wired time sensitive networking (TSN) in industrial environments to provide flexibility (in terms of mobility) and scalability (in terms of number of sensors or actuators).

The introduction of wireless devices provides more flexibility, cost effectiveness and scalability in the system, but requires for example a wireless network as defined by 3GPP to provide predictable QoS for the communication. TSN and 3GPP networks are developed and standardized as two disjoint domains which are managed independently.

For implementing the 5GS part into TSN, an approach can be used in which the 5GS appears as a TSN bridge. Basically, 5GS overall adopts a QoS framework where applications request QoS properties that the 5GS then meets using 5G QoS framework. When the 5GS appears as a TSN bridge, the 5G system receives TSN related reservation requests using the known 5G QoS framework. The 5G system then uses 5G internal signaling to satisfy the TSN reservation request.

According to some examples of embodiments, a TSN End Station "A" communicates with a TSN End Station or TSN system "C" via a time sensitive communication link of a TSN Network using a wireless communication service based on 3GPP technologies such as a 5GS based network. For this purpose, a TSN Translator (TT) and a TSN Translator Client (TTC), which acts on behalf of the TT, are introduced as a functionality to integrate a 3GPP network into the TSN network domain in a transparent manner. That is, to the TSN network, the wireless communication service of a 3GPP network acts similar to a TSN bridge, while the TSN network acts as e.g. a data network to the 3GPP network.

Figure 2:
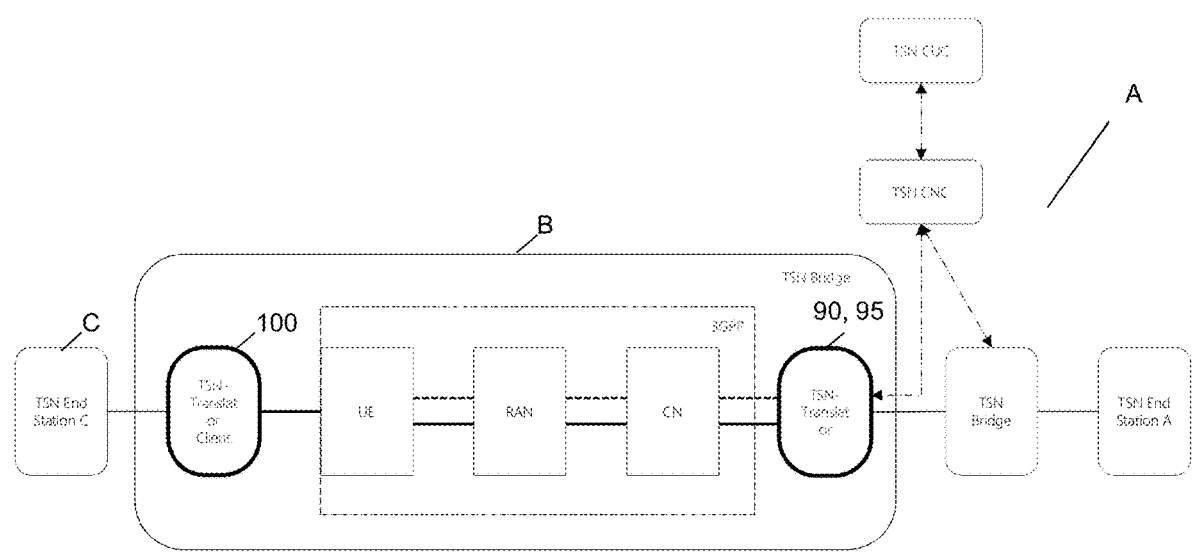
FIG. 2 shows a diagram illustrating an example of a deployment of a wireless communication network in a TSN system architecture.

FIG. 2 shows the general concept of the TT (designated with reference sign 90, 95) and its TTC (designated with reference sign 100) and how the TSN End Station C is connected to the TSN network via a wireless connection service provided by the 3GPP network. FIG. 2 corresponds to FIG. 1, but one of the bridges is replaced by the 3GPP network embedded between the TT and the TTC.

In FIG. 2 the entities of the TSN network are shown by round edged boxes and those of the 3GPP network are shown by sharp edged boxes. A UE, a RAN and an CN together constitute the 3GPP network which is enclosed within a dashed line box. The solid lines connecting the entities represent the data plane and the dotted lines the control plane. The TT and TTC shown by bold rounded boxes enable the transparent integration of the TSN network and the 3GPP network. The round edged box consisting of TT, TTC, and 3GPP network constitute the logical TSN bridge B formed on top of the 3GPP network. For simplicity, the communication paths of the TSN CUC with the TSN End Stations C and A are not shown in FIG. 2.

The TSN End Station C is connected to a UE via the TTC. The UE is responsible to establish and handle the wireless connection service for the TSN End station C. The wireless connection service contains beside the wireless link between UE and Radio Access Network (RAN) also essential Core Network (CN) services to provide for example authentication, mobility, QoS, etc.

For the transparent usage of the wireless connection service and to hide specific behavior of the 3GPP network to the TSN network and vice versa, a TT translator function can be used which works as an intermediator between both domains, i.e. it understands the TSN protocol and maps the TSN CUC and TSN CNC messages as well as the TSN network messages into control and user plane messages of the 3GPP network to trigger corresponding actions in the 3GPP network, e.g. to trigger the establishment of a wireless connection with guaranteed QoS, and vice versa. Furthermore, the TT takes cares of services like the enforcement of the priority classes for the traffic, frame translation, time gating etc. which are typically offered by the bridges in the wired network to guarantee deterministic communication. With respect to this view, the TT and TTC are placed on both sides of the 3GPP network, the network (CN) side and the UE side.

The TT and the TTC are logically part of the same translation between 3GPP and TSN network and hence, according to example of embodiments, they do not act independently. Treating them as one entity allows to hide the TSN translator at the UE side to the TSN system and to use the TSN translator at the CN side to represent the complete 3GPP network as a TSN bridge to the TSN system. This simplifies especially the configuration and handling at the TSN CNC and the respective TSN CUCs. The TT performs the major part of the translation of the TSN protocols to 3GPP commands and procedures and vice versa. The TTC at the UE side acts on behalf of the TT at the CN side and is therefore called TSN translator client.

The integration of the TSN translator with the TSN network is done by implementing the protocols for an TSN bridge, the TSN ethernet protocol to exchange messages between a TSN bridge with another TSN ethernet bridge or TSN End Station A (user plane traffic, also called data traffic) and the protocol to exchange information with the TSN CNC (control plane). Additionally, the respective communication of the TSN End Station C with the TSN CUC is also handled via the TT and its TTC.

According to some example, 3GPP network interfaces provide a set of functions which are defined for a specific 3GPP release. Therefore, the TT as well as the TTC are designed to adapt to respective new releases. As long as a 3GPP release is not closed, 3GPP may introduce additional interfaces or adaptations to interfaces or even new functional entities which allows for optimizing or simplifying respective handling of the communication for TSN networks. An example for such an adaptation is the introduction of the new PDU session type "Ethernet" to handle Ethernet traffic. The TT as well as the TTC hide the release specifications to the TSN network. The same is valid for the 3GPP network when the TSN network introduces new functions and interface modifications.

Figure 3:
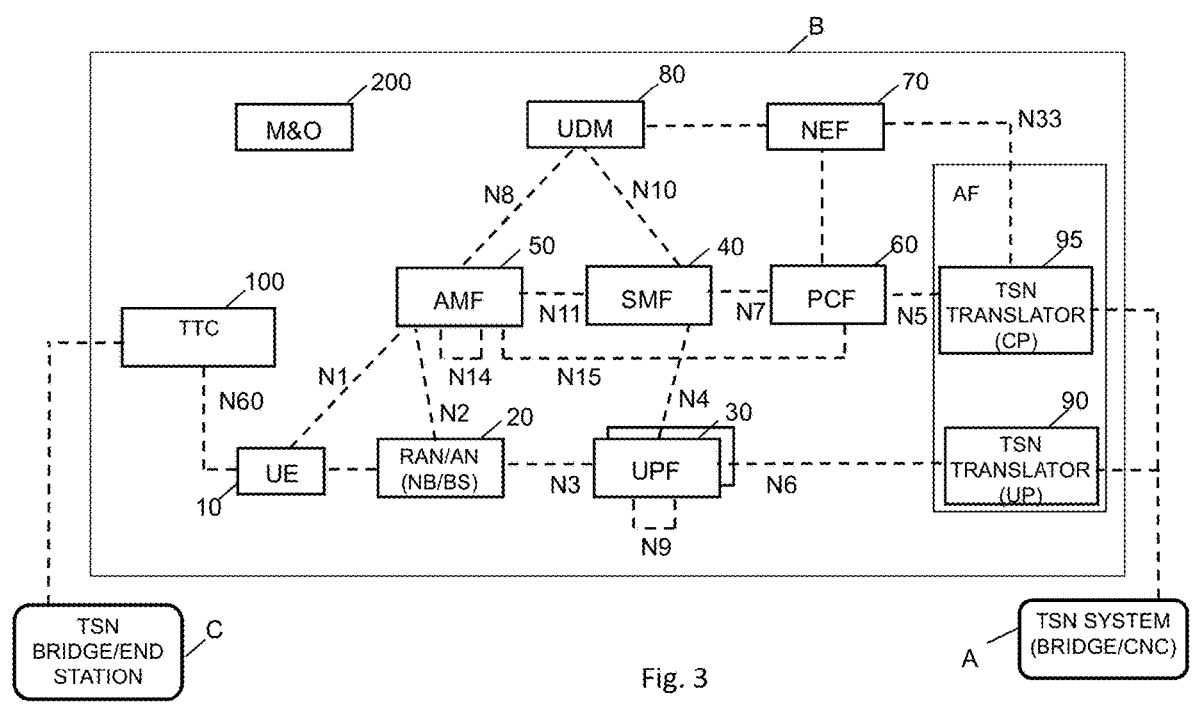
FIG. 3 shows a diagram illustrating a configuration of a communication network forming a TSN bridge.

FIG. 3 shows an example implementation for integrating TSN network with a 3GPP network, such as a 5GS network. The entities in the 3GPP network, shown within the box labelled B representing the TSN bridge, are possible functional entities resulting from the 5GS architecture. It is to be noted that corresponding examples can be mapped to other 3GPP releases or non-3GPP wireless networks. The TSN End Stations A and C could be a sensor, controller, actuator or any other industrial device, or even another TSN bridge (conventional or wireless based). In FIG. 3, the UE is shown as a separate entity, however, it is also possible that the UE is either integrated in the End Station C or can be plugged in to the TSN end station C. Similarly, the TTC could also be an integrated part of TSN end station C, the UE, or both.

According to examples of embodiments, as shown in FIG. 3, in a 5GS network portion, protocols and reference points are defined for network functions (NF) and reference points connecting NFs.

Generally, a network function can be implemented either as a network element on a dedicated hardware, as a software instance running on a dedicated hardware, or as a virtualized function instantiated on an appropriate platform, e.g., a cloud infrastructure.

As shown in FIG. 3, a communication element such as a UE 10 is connected to a RAN or access network (AN) 20 and to an access and mobility function (AMF) 50. The UE 10 is also connected to the TT element 100 which forms (e.g. together with the UE 10) the UE side bridge portion towards the TSN end station C, for example. The UE 10 represents either an ingress point (UL communication direction) or an egress point (DL communication direction) for the TSN based communication.

The RAN 20 represents a base station (BS or NB) using a NR RAT and/or an evolved LTE base station, while AN 20 is a general base station including e.g. non-3GPP access, e.g., Wi-Fi.

The core network architecture shown in FIG. 3 applied for a 5GS network comprises various NFs. As shown in FIG. 3, the CN NFs comprises the AMF 50, a session management function (SMF) 40, a policy control function (PCF) 60, a network exposure function (NEF) 70, a user data management (UDM) 80, and one or more user plane function(s) (UPF) 30. Furthermore, indicated by reference sign 200, a management entity (M&O) is provided which is used for managing the network, for example, or represents a network engineering tool.

The AMF 50 provides UE-based authentication, authorization, mobility management, etc. A UE (e.g. UE 10) even using multiple access technologies is basically connected to a single AMF because the AMF 50 is independent of the access technologies.

The SMF 40 sets up and manages sessions according to network policy. The SMF 40 is responsible, for example, for session management and allocates IP addresses to UEs. Furthermore, it selects and controls the UPF 30 for data transfer.

It is to be noted that it is also possible that in case the UE 10 has e.g. multiple sessions (communication connections), different SMFs may be allocated to each session to manage them individually and possibly provide different functionalities per session.

The UPF 30 can be deployed in various configurations and locations, according to the service type. Functions of the UPF 30 are e.g. QoS handling for user plane, packet routing and forwarding, packet inspection and policy rule enforcement, traffic accounting and reporting.

The PCF 60 provides a policy framework incorporating network slicing, roaming and mobility management, similar to a policy and charging rules function in a 4G network.

The UDM 80 stores and provides subscription data of the UE 10, similar to an home subscriber server (HSS) in 4G networks, and also network slice specific information.

The NEF 70 is used for exposing network capabilities and events to an AF.

Furthermore, application functions (AF) 90, 95 are provided. The AF 90, 95 acts as a TSN translator (TT) to and from the TSN system A (AF 90 for CP signaling, AF 95 for UP signaling, for example). Basically, the AF 90, 95 provides information on the packet flow to the PCF 60 in order to support QoS. Based on the information, the PCF 60 determines policies about mobility and session management to make the AMF 50 and the SMF 40 operate properly.

In the configuration according to FIG. 3, the AF 90, 95 form the network side bridge towards the TSN system A. Thus, the AF 90, 95 represent either an ingress point (DL communication direction) or an egress point (UL communication direction) for the TSN based communication. Similarly, as indicated above, the TTC 100 forms the device or UE side bridge portion towards the TSN end station (or a further bridge) C, for example.

As shown in FIG. 3, the NFs are connected by means of so-called reference points (N1 to N33). This representation of reference points N1 to N33 is used for illustrating how data flows are developed. For example, N1 is defined to carry signaling between the UE 10 and the AMF 50. The reference point for connecting between the RAN/AN 20 and the AMF 50 is defined as N2, and the reference point between RAN/AN 20 and the UPF 30 is defined as N3. A reference point N11 is defined between the AMF 50 and the SMF 40 so that SMF 40 is controllable by the AMF 50. Reference point N4 is used by the SMF 40 and the UPF 30 so that the UPF 30 can be set using the control signal generated by the SMF 40, and the UPF 30 can report its state to the SMF 40. Reference point N9 is the reference point for the connection between different UPFs. Reference point N15 and N7 are defined for connecting the PCF 60 to the AMF 50 and the SMF 40, respectively, so that the PCF 60 can apply policy to the AMF 50 and the SMF 40, respectively. Reference points N8 and N10 are defined because the subscription data of the UE 10 is required for the AMF 50 and the SMF 40, respectively. Reference point N5 is defined for the connection between the AF 95 and the PCF 60, and reference point N6 is defined for the connection between the UPF 30 and the AF 90. Reference point N33 is for the connection between the NEF 70 and the AF 95.

In the configuration shown in FIG. 3, TT 90, 95 and TTC 100 work as an intermediator between both domains, i.e., the TSN translator understands the TSN protocol and the 3GPP protocols and maps the TSN commands and messages into corresponding actions and messages in a 3GPP network providing 5G and vice versa.

According to some examples, two key types of information messages are differentiated by the TSN Translator:

1) The network configuration related messages of the TSN network we denote in the following by the term control plane (CP) (see also in FIG. 3) in order to be consistent with the naming convention of mobile network terminology. The CP messages, e.g. LLDP messages are converted into the corresponding control plane messages and procedures in a 3GPP network. The control plane messages and procedures are used to establish for example a packet data unit (PDU) session or a service flow and to provide for example required QoS parameters for the service flow within the PDU session. The TSN translator has an interface to respective 3GPP functional entities of the core network (CN), e.g. in FIG. 3 PCF 60 of a 5G network, which interacts directly or indirectly with further 3GPP CN functional entities like SMF 40 and AMF 50. The TSN translator acts from the 3GPP network point of view as application function (AF) and uses the N5 interface. In addition, the TSN translator derives information provided by its TSN translator client and the AF and/or PCF to act as a TSN bridge in the TSN network. A typical example is the LLDP required at a TSN bridge to be interoperable with the TSN network.

Alternatively, other options may be used to interact between 3GPP CN and TSN translator. For example, according to examples of embodiments, the TSN translator provides an interface (N33) to the NEF 70 when authentication and authorization features are needed. Alternatively, a new functional entity in 3GPP domain could be created which provides the functionality of the TSN Translator in a standardized way. SBI (service based interfaces) may also be used to realize interfaces to the TSN Translator function.

2) For the transmission of data between the End Station C and an end station connected via TSN system A, the TSN translator has an interface to the UPF 30 and the corresponding interface to the TSN bridge that connects to the TSN end station, which is denoted in the following by the term user plane (UP), again to align with the terminology applied in 3GPP networks. In FIG. 3, the UP of the TSN translator acts as a data network to the 3GPP network. On the other side, for the adjacent TSN Bridge and for CNC, it looks like a TSN bridge. With respect to the user plane functionality, according to some examples of embodiments, the TSN translator offer the following functions:

a. Removes the header information from the IP packets received at UPF 30 and create the corresponding TSN packet b. Maps the packets received in a particular PDU session to the packets to be transmitted from the corresponding egress port c. Depending on the QoS flow of the given PDU session, place the packet in the corresponding priority queue of a specific port d. Based on the gate control list specified by the CNC, it shall transmit the packets from one of the different queues through the egress port. The gate control list specifies at which time interval a packet from a specified priority queue can be transmitted at a particular egress port.

e. If the packet arrives delayed such that the gate control for this packet in the current interval is already closed, then this packet shall be dropped and not transmitted.

f. Shall introduce guard band between the transmission intervals g. Shall pre-empt the ethernet packets, which started its transmission in the previous time interval, in order to make the port be available for the packets scheduled to be transmitted at the current time interval Similar translation shall be performed when the TSN packets arrive at the TSN translator ingress ports. The priority queues shall be implemented at the translator or the translator client or both.

The UP part of the TSN Translator is realized either as:
a. UPF with extended TSN functionality: In this case, both UPF and TSN Translator UP are within a single box and intermediation between the UPF protocol and the TSN protocol is performed internally as shown in FIG. 3 or b. UPF and TSN translator UP act as two separate entities: In this case, interface between them is a proprietary interface or the N6 interface as defined by 3GPP is extended to support the TSN capabilities Similar to the TSN Translator, CP and UP translation is performed by the TSN Translator Client. The TSN Translator Client works on behalf of the TSN Translator so that the TSN Translator Client, 3GPP network and TSN Translator together appear to be a TSN bridge for the TSN network and the TSN end station C. The TSN translator client offers a blocked security port to the TSN end station C, so that the TSN end station C can send authentication related messages to the TSN CNC.

The following functions are provided by the TSN translator (TT 90, 95) and its TTC 100 together with the 3GPP network to achieve transparent integration in the TSN network:

1. The TT and its TTC are enabled to initiate PDU sessions and QoS flows with a set of pre-defined QoS parameter, e.g. 5G QoS indicator (5QI), in the 3GPP network, which are used to exchange information between TSN Translator Client and TSN Translator. The PDU sessions and respective QoS flows are used to transport information between:
   [1] TSN end station C and TSN CUC (e.g. authentication and authorization)
   [2] TT and its TTC (e.g. LLDP)
   [3] TSN end station C and other TSN end station (e.g. measurement data from a sensor to a controller)
2. The UE 10 connected to the TTC establishes the wireless connection to the 3GPP CN domain, based on standardized 3GPP authentication and authorization procedures. The TTC 100, which is connected to the UE 10 may provide additional credentials allowing to check if the UE 10 and TTC 100 together are authorized to establish a wireless connection. Optionally, the TTC 100 provides further credentials of the connected TSN end station C that is added to the credentials.
3. The 3GPP network allows to establish additional PDU sessions and QoS flows for existing and/or the new PDU sessions with a set of pre-defined QoS parameter (e.g. 5QI), which is controlled by a Policy Control Function PCF, optionally considering information provided by the TSN Translator and its TSN Translator Client on required minimum or average throughput, traffic pattern (e.g. cyclic data), maximum or average allowed packet loss, maximum or average latency, and jitter. A typical PDU session would define a maximum delay (10 ms) and further information, which needs to be guaranteed with high probability (99.999%) and minimum guaranteed bit rate (less than 1 Mbps). The information may be derived from information provided by the TSN network containing TSN CUC, TSN CNC, TSN End Stations A, and/or TSN End Station B.
4. The TT 90, 95 and its TTC 100 supports the Link Layer Discovery Protocol (LLDP) and participates in the network discovery procedure executed by the TSN CNC. The PDU session and the QoS flow represent the connection between the UE 10 and the UPF 30. This information is mapped to TSN bridge managed object's (BMO) parameters, which are then reported by the TT 90, 95 to the TSN CNC.
5. The TT 90, 95 and its TTC 100 have at least one of the following functions:
   [1] Mapping of control plane information from the TSN network and the TSN end stations to 3GPP control plane information;
   [2] Mapping of control plane information from the TSN network and the TSN end stations to information exchanged between TT and it's TTC;
   [3] Mapping of control plane information from the 3GPP network to information exchanged between TT and TTC, and TSN network and the TSN end stations;
   [4] Handling of TSN user plane, including the time gating at the egress port and the ingress port;
   [5] Handling of Time Synchronization in the TSN network;
   [6] Access control for TSN end station.
6. The 3GPP network may provide multiple PDU sessions for the UE 10 connected to the TTC to realize at least one wireless connection in the 3GPP network. Each PDU session may contain multiple QoS flows with a defined set of QoS parameters for each. The TT and its TTC maps each QoS session and its QoS parameters to TSN Bridge managed object's (BMO) parameters and reports them to the TSN CNC to allow more flexible options for the computed schedule.

As described above, the TSN translator functions at the network and the UE side include a set of functionalities that need to be supported, e.g. by either a proprietary implementation of the translators or natively by the wireless network such as the 5GS. Such functionalities are, among others: forwarding and queuing of TSN frames with respect to schedules or other additional TSN bridge functions (as defined in IEEE 802.1Qcc), Frame Replication and Elimination for Reliability (FRER), support for non-TSN-aware end stations, etc.

Among those functions, one is Layer 2 Procedures & Protocol Information handling (LLDP, SRP, MSRP). In particular the LLDP (Link Layer Discovery Protocol) is a pre-requisite for TSN operations especially in "fully centralized" and "centralized network/distributed user" configuration models of TSN. In such cases, as a first step in TSN operations, the TSN CNC needs to discover the network topology, by reading the managed objects (e.g. BMOs) created following the LLDP procedures.

Generally, LLDP is used as a component in network management and monitoring applications. Information gathered with LLDP can be stored in the device management information database (MIB) and queried. The topology of an LLDP-enabled network can be discovered by crawling the hosts and querying this database. Information that may be retrieved include system name and description, port name and description, IP management address, system capabilities (switching, routing, etc.), MAC information and the like.

LLDP information is sent by devices from each of their interfaces, e.g. upon a specific trigger or at a fixed interval, for example in the form of a frame, such as an Ethernet frame.

LLDP runs in TSN end stations and bridges on each port participating in TSN communication. LLDP operates over a single point-to-point network connection. Each link partner sends the LLDP messages towards its immediate peer according to IEEE 802.1AB. The receiving entity stores information about its peer and exposes this information using managed objects defined in IEEE 802.1AB, e.g., towards the CNC. The CNC builds a comprehensive view on the network topology by reading such managed objects from all bridges in the network.

For 3GPP network to behave like a bridge, as described above, it is necessary that the information discovered by LLDP on the UE side and the network side is always consistent with the information supplied to other network entities, like the CNC. However, current wireless communication networks, such as the 3GPP 5GS, do not support this functionality and the associated procedures.

As described in connection with FIGS. 2 and 3, it is explained how a 3GPP network is transparently integrated with a TSN network, i.e. the 3GPP network is modeled as a TSN bridge (also referred to as '3GPP bridge'). The TSN network can interact with this bridge in a usual manner (e.g. defined in IEEE 802.1Q specifications) so that the 3GPP network provides wireless connectivity service to the TSN network in a transparent way.

When using a bridge model option for the integration of 3GPP with TSN, it is necessary to support the LLDP and topology discovery which is essential for TSN operations. This includes discovery of end stations/IO devices that are connected to the UE/TSN Translator Client and providing such information to the TSN Translator (network side) and consequently to the CNC.

Consequently, it is required to provide measures allowing to signal link layer related information, such as LLDP information and in particular MAC addresses of end devices connected to the UE, towards the CN entities and finally exposing such information towards the application functions allowing to be provided to the TSN network (e.g. the CNC).

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks where mobile communication principles are integrated with TSN communications, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc., Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele) communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Figure 4:
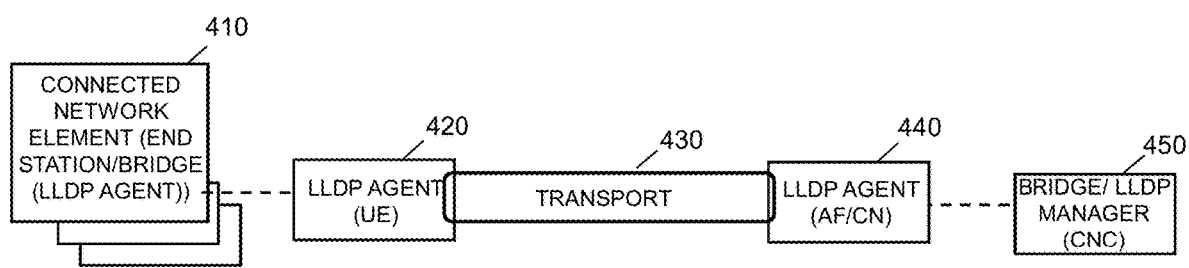
FIG. 4 shows a diagram illustrating a configuration for providing link layer related information according to some examples of embodiments.

FIG. 4 shows a diagram illustrating a configuration for providing link layer related information according to some examples of embodiments.

Basically, examples of embodiments are related to a mechanism or apparatus that acts as at least one network agent element or function, such as an LLDP agent for a wireless communication network acting as a bridge for a TSN or other Ethernet based network, such as the 3GPP bridge/5GS bridge described in connection with FIG. 3, where link layer related information, such as LLDP information, are exchanged between devices (e.g. end point devices, other bridge elements etc.) and the network agent element or function, wherein at least in part a wireless connection path, such as an air interface, in the wireless communication network, is used for transporting the LLDP information to related network elements or functions.

That is, as indicated in FIG. 4, connected network elements 410, which represent for example the TSN end station C in FIG. 3, another bridge or another LLDP agent, are connected to a UE (e.g. the UE 10 of FIG. 3) and provide (or receive) LLDP information, which are received at (or sent from) an LLDP agent 420 located in or connected to the UE. The LLDP agent 420 communicates via a transport path 430 (e.g. the 3GGP bridge B in FIG. 3) with a network agent element or function (i.e. an LLDP agent) 440, which is located e.g. in a core network element or function or in an AF of the 3GPP network. Part of the transport path 430 is a wireless communication connection, e.g. the air interface of the UE to the RAN. The LLDP agent 440 is connected with network elements, e.g. an LLDP manager (e.g. the CNC) 450, or with another bridge element 450 or the like. The LLDP agent 440 is configured, for example, to transform the LLDP information into information retrievable by the LLDP manager 450, such as BMOs.

According to some examples of embodiments, due to the wireless connections between ports located at one or multiple UEs and the network side, the apparatus is located at the network side with following functionality.

According to some examples of embodiments, the apparatus (the LLDP agent 440, for example) allows to receive LLPD information from neighboured network elements (e.g. end stations, bridge elements located at 410 or 450) or LLDP agents connected to ports on the network side and receive LLPD information from neighboured network elements (e.g. end stations, bridge elements) or LLDP agents connected to ports on the UE side; furthermore, according to examples of embodiments, the LLDP information is transformed to LLDP MIB information which are reported to LLDP managers, like a CNC.

Furthermore, according to some examples of embodiments, the apparatus allows to generate LLPD information of the 3GPP bridge/5GS bridge and to forward this LLDP information to neighboured network elements (e.g. end stations or LLDP agents 410 and bridge elements or the like 450) connected to ports on the network side and ports on the UE side.

Furthermore, according to some examples of embodiments, the apparatus may use communication services provided by translator element or function, such as an TSN Translator (TT) and it's TSN Translator Clients (TTC), to transport the LLDP information, or provides an own communication service. In the latter case, a client function for the apparatus (LLDP agent) is deployed at the UE supporting, for example, the same functionality for information transport as defined for TT and its TTC in connection with the example described in connection with FIG. 3.

Moreover, according to some examples of embodiments, the apparatus may use the translator element or function (e.g. TT and it's TTC) and the apparatus client as proxy function to forward and receive LLDP information, even in cases where the wireless connection between e.g. TT and it's TTCs or between apparatus and apparatus client is temporarily not available.

It is to be noted that according to some examples of embodiments, the apparatus may be co-located with the translator element or function (e.g. the TT) or integrated as part of the translator element or function (e.g. the TT), wherein at least one of a synchronous and an asynchronous mode can be supported.

Synchronous mode means that the link layer related information (e.g. the LLDP information) requires an active wireless connection to transport actual LLDP information between the apparatus and the neighboured network elements (e.g. LLDP agents) connected to ports provided by the translator element or function (e.g. TTC) located at the UE. Moreover, according to some examples of embodiments synchronous mode means also that an active data session is used for direct communication between the TT and the TTC.

On the other hand, asynchronous mode means that the link layer related information, such as the LLDP information, which is received by the translator client element or function (e.g. the TTC/apparatus client) or has to be provided to the neighboured network elements or LLDP agents connected to ports of the UE (i.e. the TTC) is stored temporarily at the TTC/apparatus client. When a wireless connection or session, which is authorized to transport the LLDP information, is active, the temporarily stored information from the neighboured network elements or LLDP agents is forwarded to the apparatus and the TTC/apparatus client updates the temporarily stored LLDP information. The TTC/apparatus client will then inform the neighboured network elements or LLDP agents considering configurations for the exchange of LLDP information with neighboured LLDP agents. Moreover, according to some examples of embodiments asynchronous mode means also that the link layer related information, such as the LLDP information, which is received by the translator client element of function (e.g. the TTC/apparatus client) is stored temporarily at the TTC/apparatus client, and when a suitable connection or session, which is authorized to transport the LLDP information, is active between the TTC and the TT, for example, the temporarily stored information from the neighboured network elements or LLDP agents is forwarded to the TT.

According to some examples of embodiments, in case that the apparatus uses the TT and it's TTC, the TT informs the apparatus when a wireless connection is available, or the TT is extended to temporarily store the LLDP information from the apparatus for the neighboured LLDP agents connected to the TTC. The temporary storage of the LLDP information can be configured to be overwritten when not forwarded to optimize the wireless resource usage or can be stored in a buffer to be forwarded using a standard queuing method (e.g. first in first out).

According to some examples of embodiments, the procedure and apparatus may be transparent for the wireless network, e.g. the 3GPP/5GS network. That is, the mechanism acts as a data network service. Alternatively, the mechanism may be an integrated part of the wireless network (e.g. the 3GPP/5GS network), i.e. it uses 3GPP functions and procedures to transport the LLDP information. The latter option requires to modify existing procedures or to introduce new procedures in the wireless network.

Figure 5:
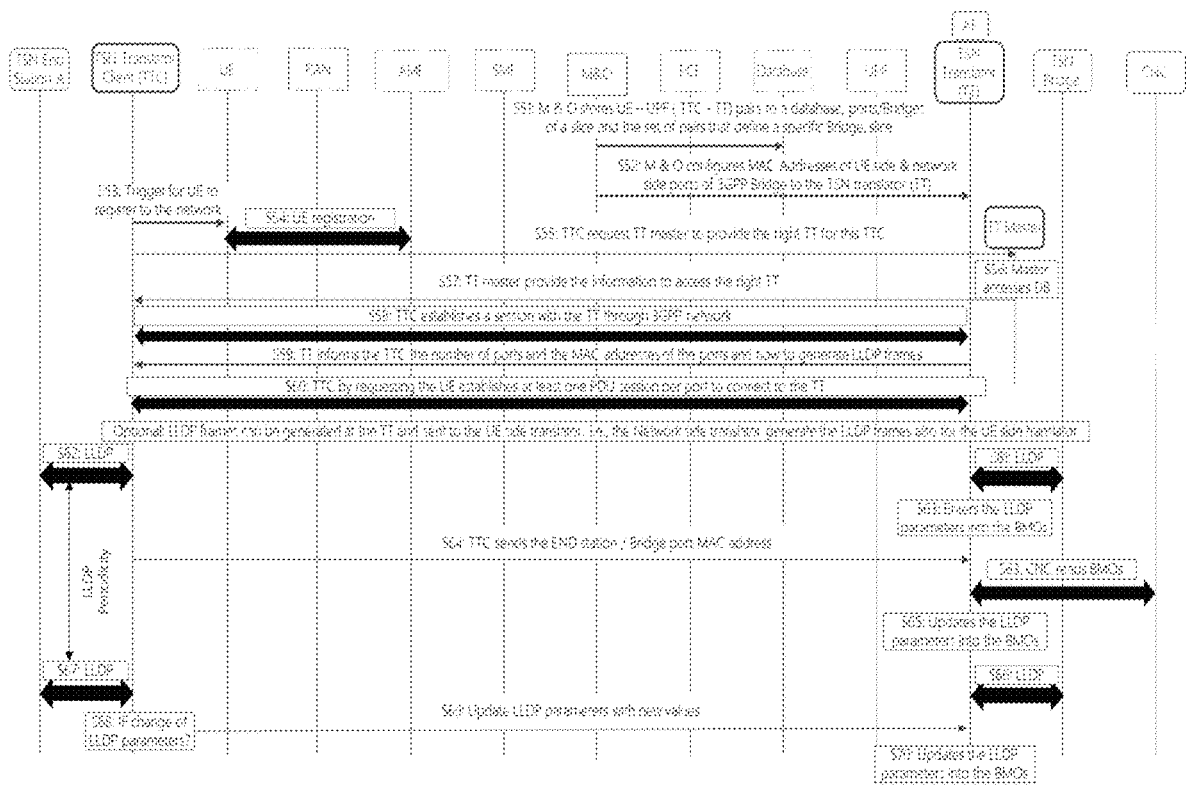
FIG. 5 shows a signaling diagram illustrating a procedure for supporting network discovery using link layer related information according to some examples of embodiments.

FIG. 5 shows a signaling diagram illustrating a procedure for supporting network discovery using link layer related information according to some examples of embodiments. Specifically, FIG. 5 is related to a case where the mechanism is implemented in the wireless network, such as a 3GPP/5GS network as shown in FIG. 3 in a transparent manner, wherein the LLDP agent element or functions 420 and 440 shown in FIG. 4 are implemented as a part of a translator element or function, specifically, of a TT and TTC as shown in FIG. 3, for example.

Basically, in the example described in connection with FIG. 5, the LLDP procedure, the ports used for communication and the corresponding MAC address of the 3GPP bridge are transparent to the 3GPP network. The LLDP functionality of the TT remains outside of 3GPP network and takes care of the ports offered by the 3GPP bridge and the LLDP procedure with the neighbouring network entity. The TT realizes the bridge ports on the network side and performs LLDP procedure on the network side bridge ports. It communicates with the TTC on the UE side to realize the bridge ports on the UE side and performs LLDP procedure (either directly by the TT or by the TTC) with the devices or bridges connected on the UE side. For this purpose, according to the present example, a default session (best effort traffic) is established between the TT and the TTC through the 3GPP network, i.e., one or more PDU sessions is/are established between the UE and CN element or function (e.g. the UPF) to which the TTC and TT, respectively, are associated.

In order to enable this procedure, the following procedure is executed, as shown in FIG. 5.

First, in S51, the information of which TT and which TTC are part of the bridge is stored in a data base. That is, an M&O element or function (e.g. M&O 200 in FIG. 3), which is, for example, a management entity of a network environment where the system is implemented, such as a management entity of the industrial network or the 3GPP network, or a network engineering tool used in an industrial network, stores UE-UPF (i.e. TTC-TT) pairs to a database. Subsequently, the M&O function allocates the 5GS bridge ports to the corresponding TT(s) (network side) and TTC(s) (UE side) of a slice. This also creates the initial association between TT and TTC(s), that is, in S52, the M&O configures the MAC addresses of the UE side and the network side ports of the 3GPP bridge to the TT.

As a part of the initial set up, in S53, the TTC requests or triggers the UE to establish a PDU session for connecting with the allocated TT. This is executed, for example, in connection with a UE registration procedure started in S54. The reason is that the allocated TT is initially not know to the UE. Thus, the TTC connects in S55 to a default TT master which is e.g. preconfigured in the TTC in order to request provision of the correct TT of the requesting TTC. In S56, the TT master accesses a database DB and reports the correct TT to the requested TTC in S57. When knowing the correct TT to be connected, the TTC requests the UE to establish at least one PDU session to enable establishment of a connection to the allocated TT (in S58). In this context, the UE requests the AMF to establish a PDU session to the appropriate UPF connected to the TT.

Once the connection between the TT and the TTC is established, in S59, the TT informs the TTC about the number of ports to be offered by the TT and the corresponding port MAC addresses. This procedure is executed periodically or trigger-based.

Depending on the number of ports offered by the TTC, the TTC requests the UE to establish a single or multiple PDU sessions e.g. one PDU session per TTC port (S60).

It is to be noted that the TT is further configured to provide assistance information to TTC in performing LLDP. For example, the TT provides the required LLDP information to the TTC so that the TTC generates the LLDP frames and provides them to the neighboring elements (e.g. end stations) in S62. Optionally, the TT generates the port-specific LLDP frames and provide these to the TTC to be transmitted on the corresponding ports on the UE side of the bridge (also in S62). It is to be noted that the TT provides in S61 the LLDP information to the network elements (or bridge) connected to the TT side.

In S63, the TT enters the LLDP parameters in managed objected, e.g. BMOs. Furthermore, in S64, the received port information about the neighbouring network nodes, especially, the MAC address of the devices connected to the other side of the ports offered by the TTC, obtained through the LLDP are sent to the TT by using the established PDU session.

The BMOs can be accessed by the LLDP manager (e.g. the CNC) via a management interface in S63.

In TSN, LLDP is performed periodically between the network nodes. When an LLDP message from a connected bridge or end station is received at the TT, in S65, the LLDP parameters are updated in the BMOs. Furthermore, when an LLDP message from a connected bridge or end station is received on one of the TTC ports (S67) and a change is detected in S68, an update of LLDP parameters is sent in S69 to the TT; that is, an update is done only when there is a change in the received LLDP parameters. By means of this, the network resource used for transmitting the LLDP related messages through the wireless network can be reduced.

In S70, the changed LLDP parameters are updated in the BMOs by the TT to be retrievable by the CNC, for example.

In the above described example, the TT which is on the network side is selected to be the master while the TTC at the UE side is selected to be the client. This is due to the assumption that the TT has the management interface to the CNC. However, according to other examples, this arrangement can be the other way around.

Figure 6:
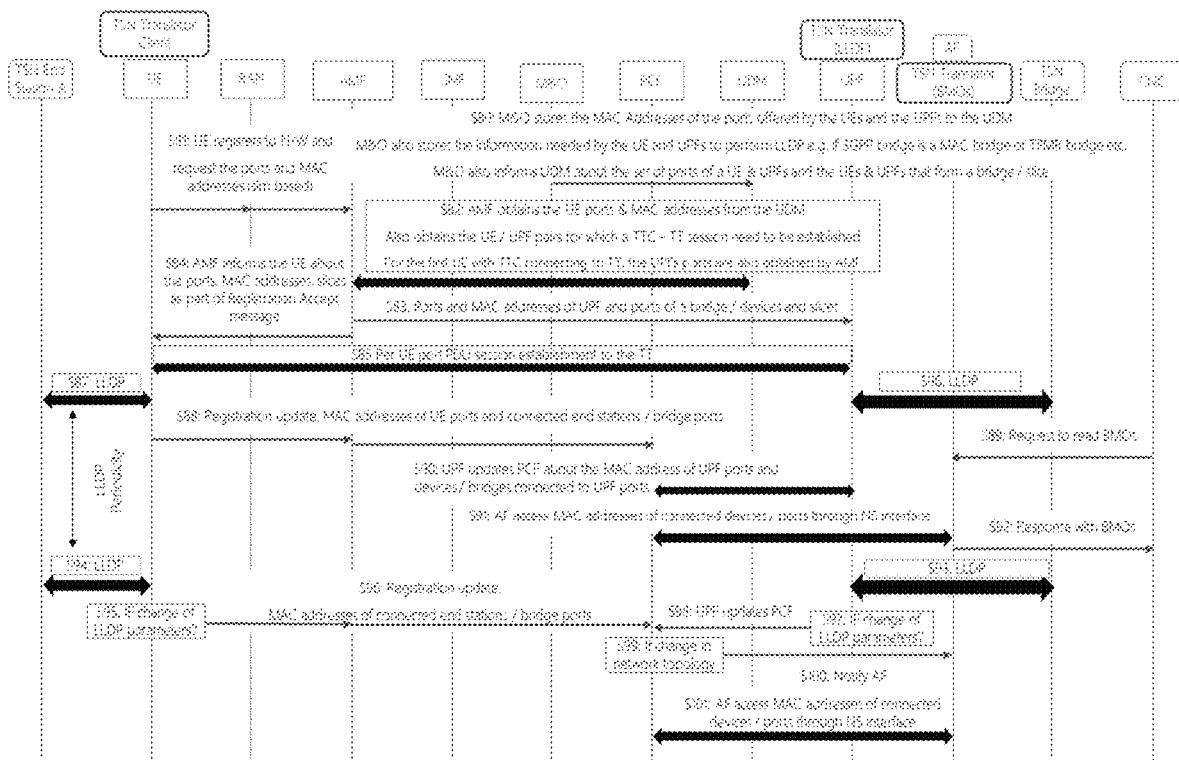
FIG. 6 shows a signaling diagram illustrating a procedure for supporting network discovery using link layer related information according to some examples of embodiments.

FIG. 6 shows a signaling diagram illustrating a procedure for supporting network discovery using link layer related information according to some examples of embodiments. Specifically, FIG. 6 is related to a case where the mechanism is implemented in the wireless network, such as a 3GPP/5GS network as shown in FIG. 3 in an integrated manner, wherein the LLDP agent element or functions 420 and 440 shown in FIG. 4 are implemented as a part of a translator element or function, specifically, of a TT and TTC as shown in FIG. 3, for example.

That is, according to the present example, the 3GPP 5GS is aware of the ports offered by the UE and core network elements or functions, e.g. UPFs. For example, the TTC is a part of the UE and the LLDP functionality of the TT is part of UPF, as shown in FIG. 6. On each port, the UE and UPFs are capable of performing LLDP with the neighbouring TSN entity. Hence, the 3GPP network is aware of the TSN end stations or bridge ports connected to the UE and the UPF. In the present example, in particular examples of signalling mechanisms are described within the 3GPP network allowing to support network discovery procedures and enable the 3GPP network to be aware of the devices connected to the 3GPP bridge.

According to the present example, a management entity, e.g. the M&O entity 200 of FIG. 3, configures a database, such as the UDM, about the ports offered by the 3GPP 5GS. The port information is distributed to the UE and UPF, for example during the initial setup procedure like a registration of the UE to the network. After performing LLDP, the parameters obtained from neighbouring TSN entities, (i.e., which end stations/bridges are connected to which port of the UE and the UPF), are collected in a central point of the network, e.g. in a core network element or function like the PCF. The PCF can be accessed via 3GPP-provided interface by non-3GPP functional elements like an application function (AF).

In order to enable this procedure, the following procedure is executed, as shown in FIG. 6.

Similar to the procedure in FIG. 5, in S80, the information of which TTCs and TTs form the bridge is stored in the database. In this case, the UDM in the 3GPP network can be used for storing this information. In addition, also the ports offered by each TTC (UE) and each TT (UPF) and their corresponding MAC addresses are stored in UDM. The port information can be, for example, SIM card specific so that it is independent of the device used for establishing a wireless connection. That is, the M&O stores into the UDM MAC addresses of the ports offered by the UEs and the UPFs, the information needed by the UE and UPFs to perform LLDP, e.g. whether the 3GPP bridge is a MAC bridge or TPMR bridge or the like. Furthermore, the M&O entity informs the UDM about the set of ports of a UE and the UPFs and the UEs and UPFs that form a bridge/slice.

In S81, the UE registers at the network. During the initial registration, according to the present example, the UE requests the number of ports and the MAC addresses to be offered by this UE. In S82, a central entity responsible for coordinating the LLDP mechanism, e.g. the AMF, fetches the corresponding information from the UDM and provides it in S84 to the UE by means of a control signaling, e.g. as a part of the registration response message. In addition, the central entity (i.e. the AMF in this example) also fetches the ports and the MAC addresses of the UPF that this UE shall possibly connect to and configure these UPFs in S83 with the corresponding port addresses.

Optionally, it is possible that the UE registers as defined in 3GPP and the AMF looking at the type of UE realizes that it is an industrial UE. Then, the AMF fetches the information described above from the UDM and informs the UE and the UPFs. It is to be noted that the UPFs need to be intimated about the number of ports and the MAC addresses only once when a first UE that is planned to be connected to this UPF is registered.

Next, the central entity (i.e. the AMF in this example) triggers the UE to establish one or more PDU sessions between the UE and the UPF (see S85). The port is to be defined to be active only after the establishment of the PDU sessions. Hence, the acknowledgement of the PDU sessions is used as the trigger to activate the port. Before the activation of the port, the port receives LLDP frames from the devices connected on the other side but the UE/UPF does not respond. At least one established PDU session is required to ensure that when the port is active, at least best effort traffic can be transmitted through it. That, is, according to examples of embodiments, link layer related information (e.g. LLDP information) is forwarded to a neighboring network element or function when the port used for connecting the neighboring network element or function is declared to be active. It is to be noted, however, for the purpose of collecting the LLDP parameters, this is not necessary.

Once the ports are activated, the UE and UPF takes part in the LLDP procedure with the adjacent network elements (see S86 and S87). From the LLDP frames, the UE/UPF learn the devices connected to the ports. This information is sent in S88 to the central entity through a control signaling, such as registration update or PDU session update message.

The central entity collects the information from all UEs and UPFs (see S90) and store them in a place accessible for external applications, e.g. the PCF.

In S89, the CNC requests the information by reading BMOs (generated by the TT, for example) from the TT functionality at the AF. In S91, the AF accesses the MAC addresses of connected devices and corresponding ports e.g. by N5 interface. That is, the external applications can regularly inquire the PCF for the topology information. Alternatively, the PCF can proactively notify the applications, whenever there is a change in the network topology.

In S92, the requested information (BMOs) is provided to the CNC.

It is to be noted that, as indicated above, LLDP can be configured to be performed periodically between the network nodes. When in S93 an LLDP message from a connected bridge or end station is received at the TT (UPF), in S97 and S98, the LLDP parameters are updated in the PCF. Furthermore, when an LLDP message from a connected bridge or end station is received on one of the TTC ports (S94) and a change is detected in S95, an update of LLDP parameters (MAC addresses of connected end stations and bridge ports) is sent in S96 to the TT, e.g. as a registration update. In S99, when there is a change in the network topology, derived from the LLDP information, the AF is notified correspondingly (S100). Then, similarly to S91, the MAC addresses of connected devices and ports can be accessed by the AF via N5 interface.

Hence, the changed LLDP parameters are updated in the BMOs by the TT to be retrievable by the CNC, for example.

According to examples of embodiments, a corresponding update is done only when there is a change in the received LLDP parameters.

It is to be noted that in both examples described in connection with FIGS. 5 and 6, the database can be configured to store slice specific information. For example, the list of ports, TT-TTC pairs that belong to a given slice are stored. This information is usable for establishing PDU sessions and performing LLDP.

Figure 7:
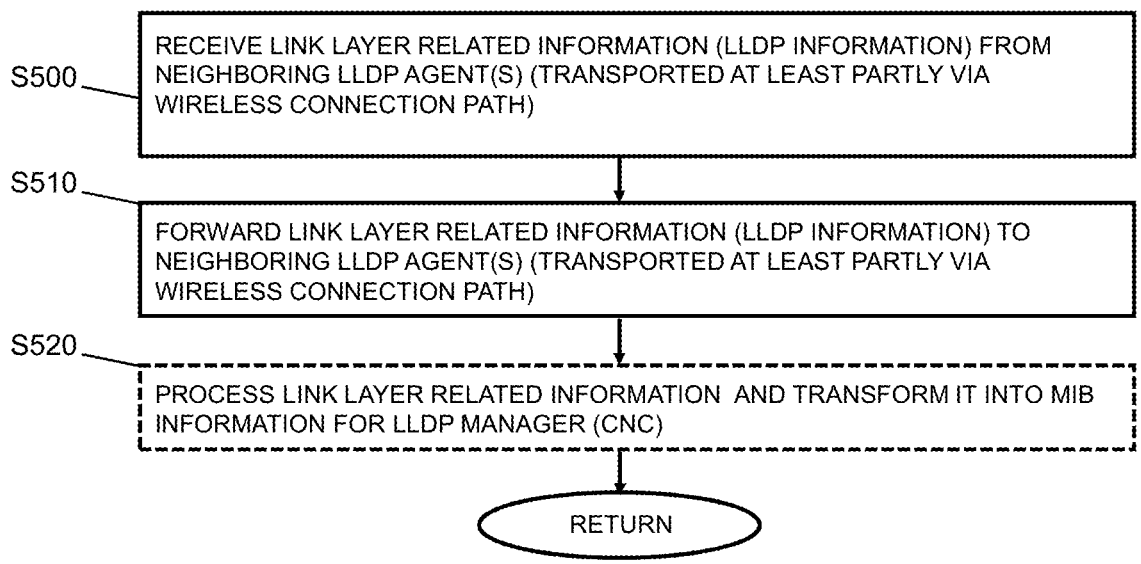
FIG. 7 shows a flow chart of a control processing according to some examples of embodiments.

FIG. 7 shows a flow chart of a processing executed by a network agent element or function (e.g. an LLDP agent element or function as indicated in FIG. 4) according to some examples of embodiments, which conducts a processing control according to examples of embodiments of the disclosure. According to examples of embodiments, the following procedure is conducted in connection with a wireless communication network, such as a wireless communication network is based on a 3GPP standard.

In S500, link layer related information, in particular first link layer related information, such as LLDP information, is received from at least one neighboring network element or function (e.g. end station 410 in FIG. 4). Based on this information, (second) link layer related information (e.g. LLDP information) are provided to at least one communication network control element or function, e.g. a CN network element like AMF, UPF, PCF, or AF (LLDP agent 440 in FIG. 4). It is to be noted that the first and second link layer related information may be the same or different to each other.

In S510, link layer related information, e.g. third link layer related information (e.g. LLDP information) is received from at least one communication network control element or function (CN network element like AMF, UPF, PCF, or AF (LLDP agent 440 in FIG. 4)), wherein on the basis thereof, fourth link layer related information is forwarded to at least one neighboring network element or function (e.g. to end station 410 in FIG. 4).

According to examples of embodiments, the second and fourth link layer related information are generated using the first and third link layer related information, respectively. Furthermore, the receiving and forwarding of the second and third link layer related information from and to the communication network control element or function is executed at least in part via a wireless connection path by using resources of a wireless communication network (for example, part of the transport 430 in FIG. 4 is wireless).

The processing is conducted in an entity which is connected to or part of one of the communication element or function (e.g. UE 10), a communication network control element or function (e.g. UPF 30) and a communication network data element or function (e.g. AF 90/95).

In S520, at least one of the first or second link layer related information is processed and transformed into management information base information (MIB, e.g. BMOs) retrievable by a management element or function for network topology discovery (e.g. CNC 450 in FIG. 4).

According to some examples of embodiments, the wireless communication network forms a bridge element for a TSN system or Ethernet based networking system, wherein a communication element or function of the wireless communication network represents one end point of the bridge element being connectable with at least one end station or another bridge element of the TSN or Ethernet based networking system, and a core network element or function of the wireless communication network represents another end point of the bridge element towards another end station or another bridge element of the time sensitive networking system or Ethernet based networking system. A translator element or function (e.g. TT 90, 95) is connected to or part of a core network element or function of the wireless communication network (e.g. of UPF, AMF or the like) and a translator client element or function (e.g. TTC 100) is connected to or part of the communication element or function (e.g. UE 10). The processing is then conducted in an entity being connected to or part of at least one of the translator element or function and the translator client element or function.

Furthermore, according to examples of embodiments, for receiving and forwarding of the second and third link layer related information from and to the at least one communication network control element or function, at least one data session between the translator client element or function and the translator element or function is established (see e.g. FIGS. 5 and 6).

Furthermore, according to examples of embodiments, for receiving and forwarding of the second and third link layer related information from and to the at least one communication network control element or function, at least one control information signaling between a communication element or function and at least one communication network control element or function of the wireless communication network is established.

Moreover, according to examples of embodiments, for receiving and forwarding of the second and third link layer related information from and to the at least one communication network control element or function, at least one data session between a communication element or function and a communication network data element or function (e.g. the AF) of the wireless communication network is established.

According to some further examples of embodiments, for receiving and forwarding the link layer related information, a communication service provided by the translator element or function and the translator client element or function is employed (e.g. in connection with the processing described in connection with FIG. 5, transparent approach).

Alternatively, for receiving and forwarding the link layer related information, an own communication service being different to that provided by the translator element or function and the translator client element or function can be employed (e.g. as described in connection with the processing of FIG. 6, integrated approach).

Moreover, according to examples of embodiments, a transparent processing for the wireless communication network is conducted, wherein processing is conducted by an entity connected, via the translator element or function or the translator client element or function, to at least one of the communication element or function (UE 10) and the communication network data element or function (e.g. AF) as an external element of the wireless communication network (see also FIG. 5). Alternatively, an integrated processing is conducted wherein the apparatus is, by the translator element or function or the translator client element or function, an internal part of at least one of the communication element or function and the core network element or function of the wireless communication network (see also FIG. 6).

According to further examples of embodiments, the link layer related information is received and forwarded in one of a synchronous mode by a direct communication via an active data session between the translator client element or function and the translator element or function, or an asynchronous mode including to temporarily store, in the translator element or function or the translator client element or function, the link layer related information until a suitable connection between the translator client element or function and the translator element or function is available.

According to further examples of embodiments, a periodical update of the link layer related information is conducted by transmitting the link layer related information from the translator client element or function towards the translator element or function, or by transmitting the link layer related information from the translator element or function towards the translator client element or function.

According to further examples of embodiments, when a change in link layer related information is detected, transmitting the link layer related information from the translator element or function towards the translator client element or function is triggered. Alternatively or additionally, transmitting the link layer related information from the translator client element or function towards the translator element or function is triggered.

According to some further examples of embodiments, information required for receiving or sending the link layer related information from or to the at least one neighboring network element or function is obtained from a communication network control element or function of the wireless communication network, such as from the PCF. This is achieved, for example, by using a control signaling procedure defined in the wireless communication network, such as a registration signaling procedure or a PDU session establishment procedure.

Furthermore, according to some examples of embodiments, information obtained by receiving the link layer related information from the at least one neighboring network element or function is provided to a communication network control element or function of the wireless communication network, such as the PCF. This is achieved, for example, by using a control signaling procedure defined in the wireless communication network, such as a registration update signaling procedure or a PDU session modification procedure.

Moreover, according to examples of embodiments, the link layer related information comprises LLDP information including MAC address information of devices connected to the network agent element or function or the at least one neighboring network element or function.

According to further examples of embodiments, the fourth link layer related information is forwarded to at least one neighboring network element or function when a port used for connecting the at least one neighboring network element or function is declared to be active. For example, declaration that the port is active can be obtained when at least one PDU session between the translator element or function and the translator client element or function has been successfully established.

Figure 8:
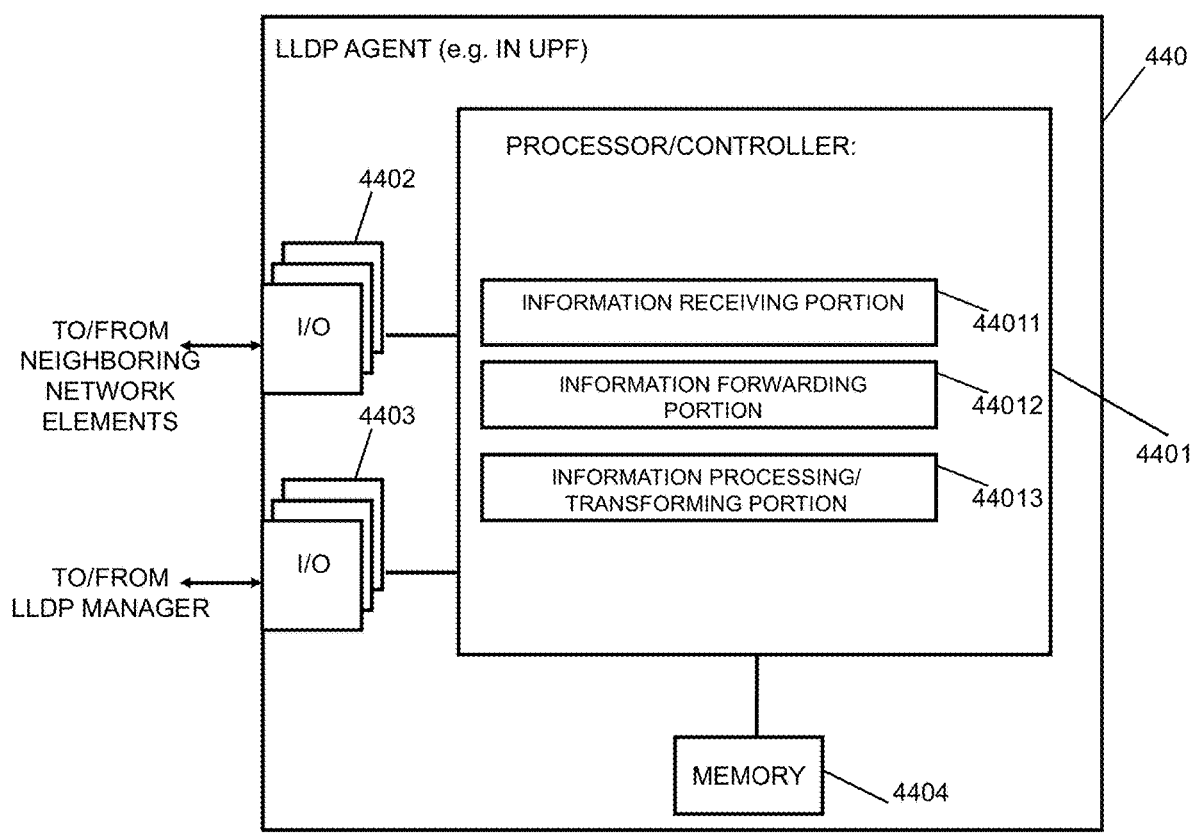
FIG. 8 shows a diagram of a network element or function representing a network agent element or function according to some examples of embodiments.

FIG. 8 shows a diagram of a network element or function representing a network agent element according to some examples of embodiments, e.g. an LLDP manager being part of the TT 440 or TTC or the like as described in connection with FIGS. 3 to 5, which is configured to conduct a control procedure as described in connection with some of the examples of embodiments. It is to be noted that the network element or function, like the TT or TTC including the LLDP agent, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element or function 440 shown in FIG. 8 may include a processing circuitry, a processing function, a control unit or a processor 4401, such as a CPU or the like, which is suitable for executing instructions given by programs or the like related to the control procedure. The processor 4401 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 4402 and 4403 denote input/output (I/O) units or functions (interfaces) connected to the processor or processing function 4401. The I/O units 4402 may be used for communicating with a neighboring network elements, such as end stations or bridges, as described in connection with FIGS. 4 to 6, for example. The I/O units 4403 may be used for communicating with a manager element of function, like CNC, as described in connection with FIGS. 4 to 6. The I/O units 4402 and 4403 may be a combined unit including communication equipment towards several entities, or may include a distributed structure with a plurality of different interfaces for different entities. Reference sign 4404 denotes a memory usable, for example, for storing data and programs to be executed by the processor or processing function 4401 and/or as a working storage of the processor or processing function 4401. It is to be noted that the memory 4404 may be implemented by using one or more memory portions of the same or different type of memory.

The processor or processing function 4401 is configured to execute processing related to the above described control processing. In particular, the processor or processing circuitry or function 4401 includes one or more of the following sub-portions. Sub-portion 44011 is a processing portion which is usable as a portion for receiving link layer related information. The portion 44011 may be configured to perform processing according to S500 of FIG. 7. Furthermore, the processor or processing circuitry or function 4401 may include a sub-portion 44012 usable as a portion for forwarding link layer related information. The portion 44012 may be configured to perform a processing according to S510 of FIG. 7. In addition, the processor or processing circuitry or function 4401 may include a sub-portion 44013 usable as a portion for processing and transforming the link layer related information. The portion 44013 may be configured to perform a processing according to S520 of FIG. 7.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

Furthermore, it is to be noted that while the above described examples are related to the usage of the mechanisms usable for network discovery in connection with a TSN network or system, it is possible to implement corresponding features also in connection with network discovery procedures used for other networks related to Ethernet or the like. Moreover, it is to be noted that while in the above described examples a translator element or function, in particular a TSN translator element or function, and a translator client element or function, in particular a TSN translator client element or function are described, the same procedures and measures are applicable to corresponding elements having comparable functions, such as a so-called network-side TSN translator (NW-TT), which is comparable with the TT element in FIGS. 3 to 6, for example, and a so-called device-side TSN translator (DS-TT), which is comparable with the TTC element in FIGS. 3 to 6, for example. NW-TT and DS-TT represents definitions for a 5GS TSN translator functionality.

According to a further example of embodiments, there is provided, for example, an apparatus for use by a network agent element or function configured to conduct a link layer information related processing, the apparatus comprising means configured to receive first link layer related information from at least one neighboring network element or function, means configured to forward second link layer related information to at least one communication network control element or function, means configured to receive third link layer related information from at least one communication network control element or function, and means configured to forward fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the apparatus is connected to or part of one of the communication element or function, a communication network control element or function of the wireless communication network and a communication network data element or function of the wireless communication network.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, a non-transitory computer readable medium comprising program instructions for causing an apparatus to perform, when conducting a communication control for a communication with at least one communication element or function in a communication network, at least the following: receiving first link layer related information from at least one neighboring network element or function, forwarding second link layer related information to at least one communication network control element or function, receiving third link layer related information from at least one communication network control element or function, and forwarding fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the method is implemented in an entity connected to or being part of one of the communication element or function, a communication network control element or function of the wireless communication network and a communication network data element or function of the wireless communication network.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

That which is claimed is:

1. An apparatus comprising:
at least one processor; and
at least one memory for storing instructions of a network agent element or function for conducting a link layer information related processing, the instructions, when executed by the at least one processor,
cause the apparatus at least:
  to receive first link layer related information from at least one neighboring network element or function, and to forward second link layer related information to at least one communication network control element or function, and to receive third link layer related information from at least one communication network control element or function, and to forward fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the apparatus is connected to or part of one of the communication element or function, a communication network control element or function of the wireless communication network and a communication network data element or function of the wireless communication network, wherein the wireless communication network forms a bridge element for a time sensitive networking system or Ethernet based networking system, wherein a communication element or function of the wireless communication network represents one end point of the bridge element being connectable with at least one end station or another bridge element of the time sensitive networking system or Ethernet based networking system, and a core network element or function of the wireless communication network represents another end point of the bridge element towards another end station or another bridge element of the time sensitive networking system or Ethernet based networking system, wherein a translator element or function is connected to or part of another core network element or function of the wireless communication network, and a translator client element or function is connected to or part of the communication element or function, and wherein the apparatus is connected to or part of at least one of the translator element or function, or the translator client element or function.

2. The apparatus according to claim 1, wherein the instructions, when executed by the at least one processor, further cause the apparatus at least:

to process at least one of the first or second link layer related information, and to transform the link layer related information into management information base information retrievable by a management element or function for network topology discovery.

3. The apparatus according to claim 1, wherein the instructions, when executed by the at least one processor, further cause the apparatus at least:

to establish, for receiving and forwarding of the second and third link layer related information from and to the at least one communication network control element or function, at least one data session between the translator client element or function and the translator element or function.

4. The apparatus according to claim 1, wherein the instructions, when executed by the at least one processor, further cause the apparatus at least:

to establish, for receiving and forwarding of the second and third link layer related information from and to the at least one communication network control element or function, at least one control information signaling between a communication element or function and at least one communication network control element or function of the wireless communication network.

5. The apparatus according to claim 1, wherein the instructions, when executed by the at least one processor, further cause the apparatus at least:

to conduct a periodical update of the link layer related information by transmitting the link layer related information from the apparatus connected to or being part of the translator client element or function towards the translator element or function, or by transmitting the link layer related information from the apparatus connected to or being part of the translator element or function towards the translator client element or function.

6. The apparatus according to claim 1, wherein the instructions, when executed by the at least one processor, further cause the apparatus at least:

to trigger, when a change in link layer related information is detected, at least one of transmitting the link layer related information from the apparatus connected to or being part of the translator element or function towards the translator client element or function and transmitting the link layer related information from the apparatus connected to or being part of the translator client element or function towards the translator element or function.

7. The apparatus according to claim 1, wherein the instructions, when executed by the at least one processor, further cause the apparatus at least:

to obtain, from a communication network control element or function of the wireless communication network, information required for receiving or sending the link layer related information from or to the at least one neighboring network element or function, by using a control signaling procedure defined in the wireless communication network.

8. The apparatus according to claim 1, wherein the instructions, when executed by the at least one processor, further cause the apparatus at least:

to provide, to a communication network control element or function of the wireless communication network, information obtained by receiving the link layer related information from the at least one neighboring network element or function by using a control signaling procedure defined in the wireless communication network.

9. The apparatus according to claim 1, wherein the instructions, when executed by the at least one processor, further cause the apparatus at least:

to forward the fourth link layer related information to at least one neighboring network element or function when a port used for connecting the at least one neighboring network element or function is declared to be active.

10. A method of a network agent element or function for conducting a link layer information related processing, the method comprising receiving first link layer related information from at least one neighboring network element or function, and forwarding second link layer related information to at least one communication network control element or function, and receiving third link layer related information from at least one communication network control element or function, and forwarding fourth link layer related information to at least one neighboring network element or function, wherein the second and fourth link layer related information are generated using first and third link layer related information, respectively, wherein receiving and forwarding of second and third link layer related information from and to at least one communication network control element or function is executed at least in part via a wireless connection path by using resources of a wireless communication network, wherein the method is implemented in an entity connected to or being part of one of the communication element or function, a communication network control element or function of the wireless communication network and a communication network data element or function of the wireless communication network, wherein the wireless communication network forms a bridge element for a time sensitive networking system or Ethernet based networking system, wherein a communication element or function of the wireless communication network represents one end point of the bridge element being connectable with at least one end station or another bridge element of the time sensitive networking system or Ethernet based networking system, and a core network element or function of the wireless communication network represents another end point of the bridge element towards another end station or another bridge element of the time sensitive networking system or Ethernet based networking system, wherein a translator element or function is connected to or part of another core network element or function of the wireless communication network and a translator client element or function is connected to or part of the communication element or function, and wherein the method is implemented in an entity connected to or being part of at least one of the translator element or function, or the translator client element or function.

11. The method according to claim 10, further comprising:
processing at least one of the first or second link layer related information, and
transforming the link layer related information into management information base information retrievable by a management element or function for network topology discovery.

12. The method according to claim 10, further comprising:
establishing, for receiving and forwarding of the second and third link layer related information from and to the at least one communication network control element or function, at least one data session between the translator client element or function and the translator element or function.

13. The method according to claim 10, further comprising:
establishing, for receiving and forwarding of the second and third link layer related information from and to the at least one communication network control element or function, at least one control information signaling between a communication element or function and at least one communication network control element or function of the wireless communication network.

14. The method according to claim 10, further comprising:
conducting a periodical update of the link layer related information by transmitting the link layer related information from the translator client element or function towards the translator element or function, or by transmitting the link layer related information from the translator element or function towards the translator client element or function.

15. The method according to claim 10, further comprising:
triggering, when a change in link layer related information is detected, at least one of transmitting the link layer related information from the translator element or function towards the translator client element or function and transmitting the link layer related information from the translator client element or function towards the translator element or function.

16. The method according to claim 10, further comprising:
obtaining, from a communication network control element or function of the wireless communication network, information required for receiving or sending the link layer related information from or to the at least one neighboring network element or function, by using a control signaling procedure defined in the wireless communication network.

17. The method according to claim 10, further comprising:
providing, to a communication network control element or function of the wireless communication network, information obtained by receiving the link layer related information from the at least one neighboring network element or function by using a control signaling procedure defined in the wireless communication network.

18. The method according to claim 10, further comprising:
forwarding the fourth link layer related information to at least one neighboring network element or function when a port used for connecting the at least one neighboring network element or function is declared to be active.

* * * * *